United States Patent Office 2,961,231
Patented Nov. 22, 1960

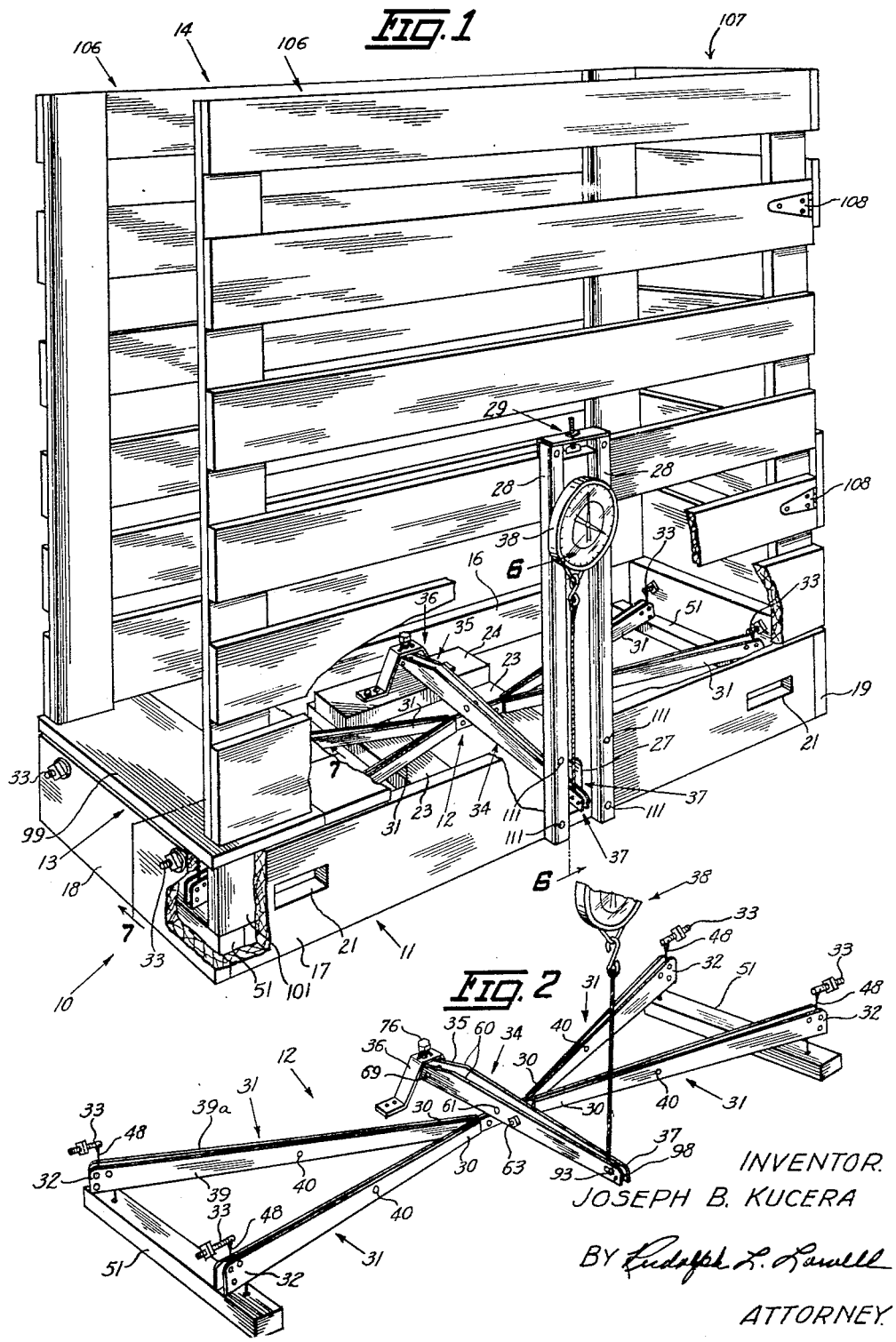

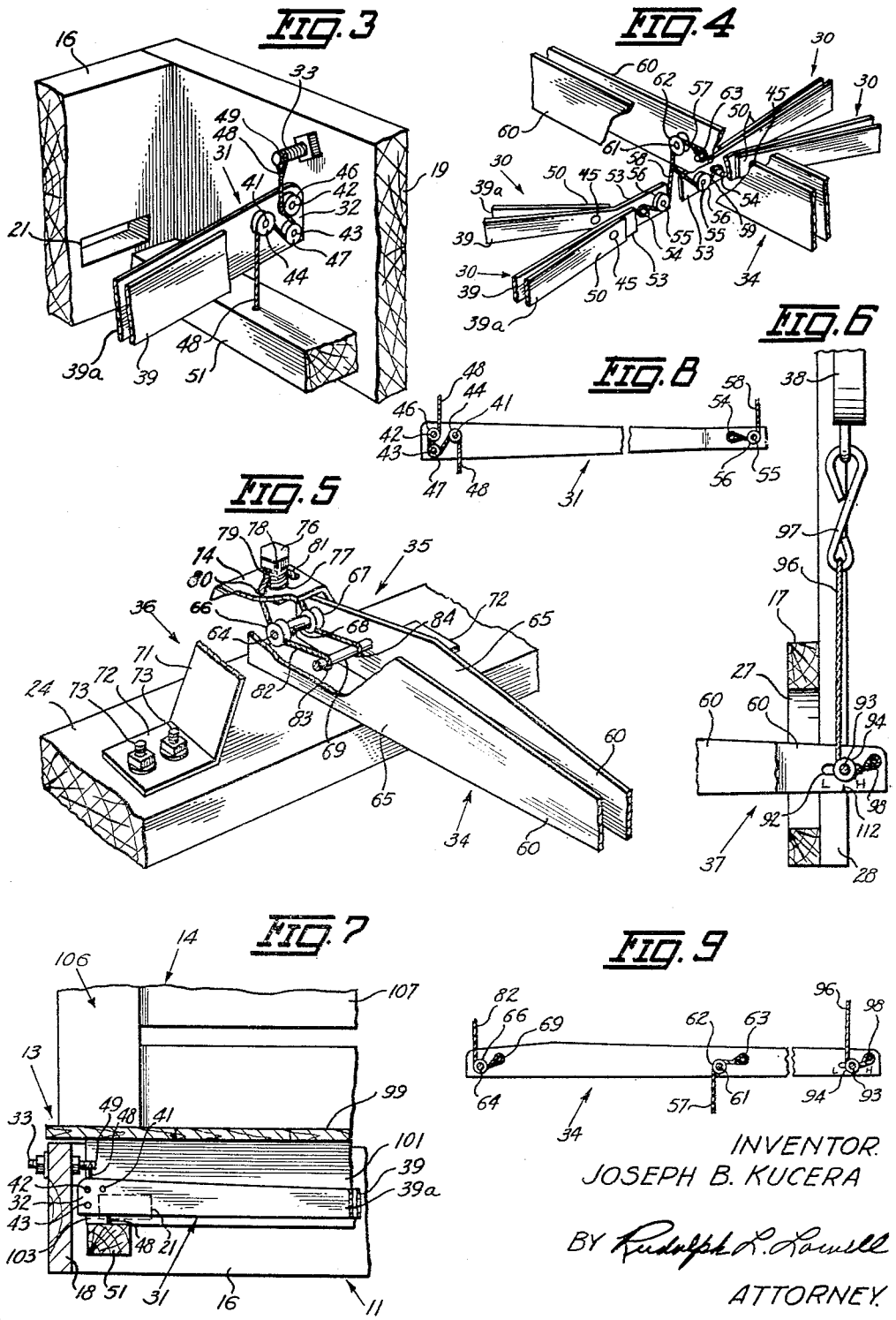

2,961,231

WEIGHING APPARATUS

Joseph B. Kucera, Traer, Iowa

Filed July 31, 1957, Ser. No. 675,373

1 Claim. (Cl. 265—71)

This invention relates to scales and particularly to a scale apparatus for weighing livestock. More particularly the invention is directed to an improved suspension system for transmitting the load on a scale platform to an indicating device.

Due to present day scientific methods of raising and feeding livestock, coupled with a day by day market price fluctuation for livestock and the variations in price relative to a particular weight of an animal, the need is imposed upon the farmer of having available an apparatus for accurately weighing his livestock. The farmer is then in a position to definitely determine pound gains per pound of feed used, and to know in advance of shipping to market, the weight class of his livestock commanding the best selling price.

Thus, an object of this invention is to provide an improved weighing scale apparatus for weighing live animals.

Another object of this invention is to provide a weighing apparatus which may be readily assembled for use and disassembled for storage or transport.

Another object of this invention is to provide a weighing apparatus which is adaptable to be effectively used by a farmer either inside or outside and under all weather conditions.

Yet another object of this invention is to provide a weighing apparatus which will readily and accurately indicate the weight to be ascertained.

Another object of this invention is to provide a weighing apparatus which is efficient in use, rugged in service, simple in operation, and economical of manufacture.

These and other objects may be readily ascertained from the following description and the accompanying drawings, in which:

Fig. 1 is a perspective view of a weighing scale apparatus embodying the features of this invention, with parts broken away to more clearly show its construction;

Fig. 2 is a perspective view of the weighing mechanism of Fig. 1;

Figs. 3, 4 and 5 are enlarged fragmentary perspective views of details of the weighing mechanism shown in Fig. 2, with certain parts broken away for the purpose of clarity;

Fig. 6 is an enlarged vertical sectional view taken along the line 6—6 of Fig. 1;

Fig. 7 is a reduced vertical sectional view taken along the line 7—7 of Fig. 1; and Figs. 8 and 9 are diagrammatic showings of the suspension arrangements.

Referring now to the drawings, particularly to Fig. 1, a weighing scale apparatus 10 is disclosed which includes a base unit 11, a scale mechanism 12 secured to and suspended within the base unit 11, a platform unit 13 which rests upon the scale mechanism 12, and a three-sided frame or stall unit 14.

The base unit 11 is of an open rectangular shape and includes a pair of side members 16 and 17 and end members 18 and 19. Openings 21, only two of which are shown, are formed adjacent the ends of the side members 16 and 17, for a purpose hereinafter to be described. A pair of longitudinally spaced support elements 23 are secured across the bottom of the base unit 11 intermediate the end members 18 and 19, and a brace element 24 is secured across the supports 23 at a position adjacent to the side 16. An opening 27 is formed in the side member 17 intermediate the ends thereof and a pair of upright elongated bars 28 are secured to the outer surface of the side 17 on opposite sides of the opening 27. The bars 28 are connected together at their top ends by a securing device 29.

The scale mechanism 12 (Fig. 2) includes four horizontally disposed levers 31 of equal length arranged in an X formation within the base unit 11 whereby the inner ends 30 of the levers 31 are centrally located within the base, and the outer ends 32 of the levers 31 are located in the four corners of the base unit 11. The outer end 32 of each lever 31 is pivotally suspended from a holding device 33 carried in the end members 18 and 19, as will be explained in detail hereinafter, and the inner ends 30 of the levers 31 are suspended from the center of a pivot arm or scale beam 34. The scale beam is pivoted at one end 35 to a bracket unit 36 supported on the brace element 24, and is suspended at its other or outer end 37 from a conventional weight indicating spring-type scale member 38, which is mounted on the upstanding bars 28.

As each lever 31 is constructed and suspended from the base 11 at the outer end 32 thereof in the same manner, only one of the levers 31 therefore will be described in detail with like reference numbers being used to indicate like parts. A lever 31 includes a pair of transversely spaced, elongated straps 39 and 39a connected together intermediate their ends by a spacer device 40. At the outer end 32 of each lever 31 (Fig. 3) three bolts 41, 42 and 43 secure the outer portions of the straps 39 and 39a together. The bolts are placed in a triangular arrangement whereby the two upper bolts 41 and 42 are horizontally aligned and the third bolt 43 is vertically arranged below the bolt 42. Three circular spools or blocks 44, 46 and 47 are each fixedly secured to the bolts 41, 42 and 43, respectively, between the end portions of the straps 39 and 39a.

A suspension device, such as a cable 48 (Fig. 3) has one end secured to a holding device 33 and from such end is trained about the blocks 44, 46 and 47 by being passed vertically downwardly over the inner face of the block 46, around the lower face of the block 47, and then over the upper face of the block 44, for securement of its other end to a floating weight receiving or support member 51. A support 51 is an elongated member extended transversely of the base unit 11 adjacent the end members 18 and 19. It may be seen that by placing a weight on the member 51, the interconnection of the cable 48 with the formation of blocks will tend to bring the blocks 44 and 47 into horizontal alignment, thus causing a pivoting rotative movement of the lever 31. Thus, the formation of blocks 44, 46 and 47 forms a pivot structure, and, when interconnected with the cable 48, provides for each lever 31 being pivotally suspended from a holding device 33. By being attached at each end to the free end of a cable 48, a support member 51 is suspended from the base unit 11 for vertical movement in a manner to coact with the respective levers 31.

At the approximate junction of each pair of transversely opposite levers 31, the inner end 50 (Fig. 4) of each strap 39a is secured, as by a rivet 45 or other device, to its corresponding strap 39. However, the inner ends 53 of each strap 39 continue beyond the ends 50 of the straps 39a in a parallel, transversely spaced relation to positions underlying the scale beam 34. As a result, the inner ends 53 of the strap members 39 are arranged below the longitudinal center portion of the beam 34.

The inner ends 53 (Fig. 4) of each transversely adjacent pair of straps 39 of the levers 31 are secured together by two horizontally aligned bolts 54 and 55, which are also horizontally aligned with the bolts 41 and 42 (Fig. 8). A fixed spool or circular block 56 is mounted on each bolt 55. A cable 57, secured to the scale beam 34, is formed so as to have two depending strands 58 and 59 each of which passes under the face of a corresponding block 56 for securement to a corresponding bolt 54. It is noted the cables 48 and 57 each are trained over corresponding sides or faces of the respective blocks 44 and 56 (Fig. 8).

The scale beam 34, placed substantially intermediate the end members 18 and 19 of the base unit 11, is comprised of two longitudinally spaced straps 60, the supported ends 65 of which are diverged or flared outwardly from each other (Fig. 5). At a point intermediate the ends 35 and 37 of the scale beam 34, a bolt 61 (Fig. 4) secures the straps 60 together. A spool or circular block 62 is fixedly secured to the bolt 61. The cable 57 is attached at one end to another bolt 63 which is secured between the straps 60 in a spaced relation with the bolt 61. From the bolt 63, the cable 57 is passed over the block 62 and extends through the cable strands 58 and 59 to the adjacent inner ends 53 of the lever arms 31.

The supported ends 65 of the straps 60 are connected by a curved bolt 64 (Fig. 5) which fixedly carries a pair of spools or circular blocks 66 and 67 that are longitudinally spaced on the bolt 64 by a spacer unit 68. A bolt 69 spaced from the bolt 64 toward the scale beam end 37 is secured between the strap ends 65 for a purpose hereinafter described.

The bracket unit 36 (Fig. 5), on which the end 35 of the scale beam 34 is pivotally mounted, comprises an inverted U-shaped body member 71 having a pair of outer flanges 72 secured, as by nut and bolt assemblies 73, to the brace element 24, and a flat roof or top section 74 intermediate the flanges 72. A cable clamping bolt 76 has a bifurcated shank 78 threaded through an opening 77 located centrally in the roof section 74. The bracket 36 is mounted so that the center of the opening 77 lies approximately on the longitudinal axis of the scale beam 34.

A pair of openings 80 and 81 are formed in the roof section 74 at opposite sides of the center opening 77. A single cable 82 is secured at 83 to the bolt 69 and is passed beneath one block 66 and upwardly through one opening 80 in the roof section 74. The cable is then passed through a slot 79 formed in the bifurcated shank 78 of the bolt 76, downwardly through the other opening 81 and under the block 67 and is finally secured at 84 to the bolt 69. The points 83 and 84 of securement of the cable 82 to the bolt 69 are longitudinally spaced thereon.

The outer end 37 of the scale beam 34 (Fig. 6) extends through the opening 27 formed in the side member 17 and each strap 60 thereof has a transversely elongated slot 92 formed therein, the slots 92 being longitudinally aligned with respect to the base unit 11. A bolt 93 is inserted through the slots 92 for connecting the straps 60 together and a spool or circular block 94 is fixedly mounted on the bolt 93 between the straps. A cable 96 is secured at one end to a device 97 attached to the spring scale 38 and depends vertically therefrom to the block 94. The cable 96 passes under the block as indicated (Fig. 6) and is attached at the other end to a bolt 98 which is connected between the straps 60 outwardly of the bolt 93.

It is to be noted that the bolts 64 (Fig. 5), 61 (Fig. 4), and 93 (Fig. 6) which connect the pivot arm straps 60 together and to which are secured the blocks 66, 62, and 94, respectively, are transversely and horizontally aligned (Fig. 9). Additionally, for purposes of accurate balancing and weighing, the bolts adjacent the respective blocks, namely bolts 69, 63, and 98, to which the respective cables are attached, also lie in a common horizontal plane and on the same side of the adjacent block, whereby the respective cables are trained over corresponding sides or faces of the respective blocks (Fig. 9).

Referring particularly to Figs. 1 and 7, the floating platform unit 13, utilized with the floating supports 51 for receiving a load to be weighed, includes a relatively flat platform section 99 having overall dimensions substantially equal to those of the base unit 11, and a pair of elongated elements 101 secured to and extended longitudinally on each side of the platform section 99 in transversely spaced relation. The depth and lateral spacing of the elongated elements 101 are such that when the platform unit 13 is placed within the base unit 11 with the elements 101 in a depending position, the elements rest upon each floating support member 51 at an outer end thereof so as not to interfere with the operation of the lever arms 31 or the scale beam 34. The slots 21 are visual aids to the proper placement of the unit 13 within the base unit 11.

The stall unit 14 (Fig. 1), arranged to enclose and retain the animal to be weighed when standing upon the platform unit 13, is comprised of two side sections 106, each of a length approximately equal to the length of the platform unit 11, and a gate section 107. Each side section 106 is removably secured in an upstanding manner onto a longitudinal side of the platform section 99 and the gate section 107 is swingably attached to an end of one side section, as by hinge devices 108, and is releasably attachable to the corresponding end of the other side section by a latch device (not shown).

In use, and referring to Fig. 1, an animal to be weighed is led within the stall unit 14 so as to be supported on and received by the platform unit 13 and thus the floating supports 51. As described hereinbefore, the operative association of each cable 48 with the pivot structure of the blocks at each outer end 32 of a lever 31, actuated by the weight received by supports 51, results in a pivotal movement whereby the inner ends 30 of the levers 31 are pivoted downwardly, the combined downward force being transmitted through the center cable 58 to the scale beam 34. The beam 34 is then pivoted about its bracket end 35 whereby the resultant downward force at the outer end 37 is transmitted through the cable 96 and is registered at the spring scale 38.

To obtain the true weight of the animal being weighed, the reading on the scale 38 is multiplied by the ratio of the distances from the outer cable supporting block 94 on the scale beam 34 and the center cable supporting block 62 to the inner cable supporting block 66 at the bracket 36. As indicated hereinbefore, this ratio is two to one, thus the reading on the scale 38 should be multiplied by two to obtain the true weight of the animal being weighed. When the center of the bolt 93 is aligned with the indicia 112 indicating the center of the slot 92 (Fig. 6) the scale 38 is set for normal operation. Should the scale be weighing light, the block 94 is moved to the left toward the indicia L. Should the scale 38 indicate it is weighing heavy, then the block 94 is moved to the right toward the indicia H. When the weight of the animal has been ascertained, the gate section 107 is swung open and the animal led off the platform 13 in the direction it was facing.

The weighing scale apparatus 10 is readily adaptable to being disassembled and assembled for purposes of convenient transportation and ease of use. The scale mechanism 12 is enclosed within the confines of the base 11 except for the slight projection of the outer end 37 of the scale beam 34. The spring scale 38 may be readily engaged or disengaged from the scale mechanism 12 by attaching or detaching the cable securing device 97 from the scale 38. The scale supporting unit, including the bars 28, is held in place by four cap screws 111 (Fig. 1) which secure the bars 28 to the frame base side 17. The floating platform 13 may readily be lifted out of or placed within the base unit 11, and by disconnecting the side sections 106 from the platform unit 13, the stall unit 14 may be separated therefrom. Additionally, by removing the gate section hinges 108, the unit 14 separates into three sections, the two sides and the gate.

The invention thus consists of providing an improved weighing apparatus which includes a base unit 11 for containing means in the form of the floating support members 51 for receiving a load from the platform unit 13 whereby the load is transmitted through the levers 31 and the scale beam 34 arrangement to the weight indicating scale member 38 by virtue of the operative association of the members 51 acting through the suspension cables 48 on the pivot structure formed by the blocks 44, 46, and 47 at each outer end 32 of the levers 31.

Although only one embodiment of the invention has been disclosed and described, the invention is not to be so limited, as various modifications and alternate constructions may be made within the full scope of the invention as defined by the appended claim.

I claim:

A weighing device comprising an open, rectangularly shaped base unit, weight receiving means disposed within said base unit, weight transmitting means including a scale mechanism within said base unit having four levers arranged in an X formation with pairs of the inner ends of said levers joined in facing relation, each pair of joined inner ends having a transversely projected spool member attached thereto, the outer ends of said levers located at corresponding corners of said base unit, a pivot structure on each of said outer ends including three transversely projected elements arranged in a right triangular relation with two of said elements being horizontally aligned with said spool member, a flexible member at each corner of said base unit secured at one end to said base unit and at the other end to said weight receiving means, with the intermediate portion of said flexible member being trained through a corresponding adjacent pivot structure whereby a corresponding lever is pivotally moved in response to the placement of a load on said weight receiving means, weight indicating means supported on said base unit, and scale beam means extended transversely within said base unit and pivotally suspended at one end thereof from said base unit and connected at the other end to said weight indicating means, a second flexible member secured to said scale beam means centrally thereof and depended therefrom, said second flexible member forming at its lower end a pair of strands each of which is trained under said spool member from one side thereof and secured to the respective pair of joined inner ends on the other side of said spool member.

References Cited in the file of this patent

UNITED STATES PATENTS

| | | |
|---|---|---|
| 99,169 | Dewer | Jan. 25, 1870 |
| 197,489 | Onslow | Nov. 27, 1877 |
| 489,930 | Clawson et al. | Jan. 17, 1893 |
| 740,109 | Edgar | Sept. 29, 1903 |
| 1,790,509 | Moyer | Jan. 27, 1931 |
| 2,736,549 | Paul | Feb. 28, 1956 |

FOREIGN PATENTS

| | | |
|---|---|---|
| 83,652 | Germany | Feb. 9, 1895 |
| 280,945 | Italy | Mar. 23, 1929 |